D. BASCH.
PROTECTIVE MEANS FOR SYSTEMS OF DISTRIBUTION.
APPLICATION FILED SEPT. 12, 1917.
1,347,772.
Patented July 27, 1920.
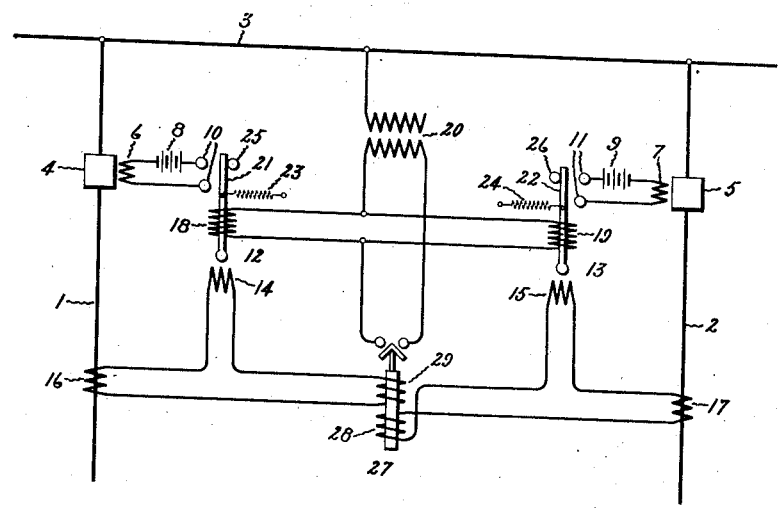
Inventor:
David Basch,
by
His Attorney.

UNITED STATES PATENT OFFICE.

DAVID BASCH, OF SCHENECTADY, NEW YORK, ASSIGNOR TO GENERAL ELECTRIC COMPANY, A CORPORATION OF NEW YORK.

PROTECTIVE MEANS FOR SYSTEMS OF DISTRIBUTION.

1,347,772.

Specification of Letters Patent. Patented July 27, 1920.

Application filed September 12, 1917. Serial No. 190,897.

*To all whom it may concern:*

Be it known that I, DAVID BASCH, a citizen of the United States, residing at Schenectady, county of Schenectady, in the State of New York, have invented certain new and useful Improvements in Protective Means for Systems of Distribution, of which the following is a specification.

My invention relates to electrical protective means for systems of distribution, and has for its object to provide a novel and improved relay means for the protection of parallel feeders which is operative upon a reversal of power on any feeder to select the feeder at fault irrespective of the magnitude of the voltage drop occasioned by the fault.

In the protection of parallel feeders it has been the usual custom to use reverse power relays having current coils connected to the feeder to be protected and potential coils connected to potential transformers on the station lines. Such systems of protection have experienced some difficulty due to the fact that a heavy short circuit would cause such a drop in potential on the system that not enough current passed through the potential coils of the reverse power relays to enable them to effectively coöperate with the current coils to operate the relays.

By the protective scheme of my invention, I provide a reverse power relay for each feeder, each relay having coöperating potential and current coils, and in order that these relays may positively operate irrespective of the magnitude of the drop in voltage occasioned by a fault, each potential coil consists of a relatively large number of turns of fine wire whereby upon the greatest drop in potential that may occur, due, for instance to a short circuit, the ampere turns of said potential coils will be sufficient to produce effective coöperation with the current coils. In order, however to prevent the potential coils from burning out under normal operating voltages, I provide means for rendering the potential coils normally inoperative by connecting the coils in a normally open circuit which is controlled by an electro-responsive device operative in response to a relative reversal of current on the feeders to render said potential coils operative by the closing of the normally open circuit including the coils.

The novel features which I believe to be characteristic of my invention will be definitely indicated in the claims appended hereto, while the features of construction and mode of operation will be understood from the following description taken in connection with the accompanying drawings in which the single figure of the drawings shows diagrammatically two parallel feeders protected by the novel protective means of my invention.

In the figure, I have shown, for purposes of clearness in one line diagram, two parallel feeders 1 and 2 connected to a station conductor or bus bar 3. Each of the feeders 1 and 2 are connected to the bus 3 through suitable circuit controllers or switches 4 and 5 respectively, which are adapted to be automatically opened by trip coils 6 and 7 respectively, located in auxiliary circuits supplied with energy from suitable sources of current, such as batteries 8 and 9 respectively. The circuits of trip coils 6 and 7 are normally open at contacts 10 and 11 respectively which contacts are controlled and adapted to be closed by independent relay means responsive to reverse power condition, such as reverse power relays 12 and 13 respectively. These relays 12 and 13 comprise current coils 14 and 15 and potential coils 18 and 19 respectively, the current coils 14 and 15 being connected to the conductors 1 and 2 through their respective transformers 16 and 17. I have shown the reverse power relays 12 and 13 as of the dynamometer type. In the illustration shown, the potential coils 18 and 19 are excited from a common potential transformer 20 and are movable in the field produced by the current coils 14 and 15. The connection for only one side of the transformer 20 is shown, it being understood that the other side of the transformer is connected to one of the other station busses. The potential coils carry movable contacts 21 and 22 respectively to engage contacts 10 and 11 respectively to complete the circuits of the trip coils 6 and 7 respectively and are biased to open or normal position by any suitable means such as the springs 23 and 24 respectively, and are held in this position against suitable stops 25 and 26. In order to produce effective magnetic fields under conditions of low voltage for coöperation with the fields set up by the current coils, the potential coils 18 and 19 comprise a relatively large number of turns of fine wire and are connected in parallel in a normally open circuit in order to protect the coils from normal potentials. For controlling the circuit of the potential coils, I provide an electroresponsive device 27 comprising two windings 28 and 29 connected in series with the current coils 15 and 14 respectively and responsive to current in the two conductors or feeders 1 and 2 respectively. The windings 28 and 29 are wound opposed to each other or to normally neutralize each other to hold the device 27 open and on relative reversal of current in the conductors 1 and 2, the windings assist each other to move the relay to closing position.

The operation of my protective means may be described as follows: Under normal conditions, current flows in the two feeders or conductors 1 and 2 in the same direction and by means of transformers 16 and 17, the current coils 14 and 15 of the relays 12 and 13 are energized. Windings 28 and 29 of the control device 27 are also excited from the transformers 17 and 16 respectively, but being oppositely wound, the action of each coil is neutralized and the control relay 27 remains in position to hold the circuit of the potential coils 18 and 19 open and the coils inactive. The relays 12 and 13 are therefore normally inoperative.

Let us assume that a short circuit occurs on one feeder, feeder 1 for instance, causing a relative reversal of power flow on that feeder. Then the current flow in the current coil 14 of relay 12 corresponding to the faulty feeder 1 and the coil 29 of the electroresponsive device 27 reverses and coil 29 then assists coil 28 and operates the electroresponsive device 27 to close the circuit of potential coils 18 and 19 and energize these coils. Due to the ampere turns in the potential coils 18 and 19, effective fields are produced, even on the greatest drop in potential caused by the short circuit on feeder 1, which coöperate with the fields set up by the current coils 14 and 15 to produce a good operating torque in the relays. The fields of coils 15 and 19 of relay 13 are in such a direction to move the contact 22 against its stop 26 while the fields of coils 14 and 18 of relay 12 are in a direction to move the contact 21 into engagement with contacts 10 to close the circuit of trip coil 6 thereby causing the opening of the switch 4 corresponding to the faulty feeder. When the switch 4 opens, the coil 14 and winding 29 are deënergized permitting the control device 27 to return to its normal position and opening the circuits of the potential coils thereby rendering the relays 12 and 13 again inoperative.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:

1. The combination with two parallel feeders, reverse power relays associated with each feeder having current and potential elements effectively coöperating on conditions of reversal accompanied by low voltage, and means for holding said relays inoperative until a relative reversal of power occurs on said feeders.

2. The combination with two parallel feeders, of reverse power relays associated with each of said feeders comprising current responsive coils, and coöperating potential responsive coils having a relatively large number of turns, a normally open circuit including said potential coils connected in parallel, and means for closing said circuit in response to a relative reversal of current flow in said feeders.

3. The combination with two parallel feeders, relays responsive to the direction of power flow in said feeders comprising current coils, and potential coils wound to effectively coöperate with said current coils under conditions of low voltage, a normally open circuit including said potential coils, and an electroresponsive device for closing said circuit in response to the relative reversal of current flow in said feeders.

4. The combination with two parallel feeders, reverse power relays for said feeders comprising current coils, and potential coils having a relatively large number of turns, means holding one of said coils of each relay inactive as long as the direction of current flow is the same in each feeder but rendering said elements active upon relative reversals of current in said feeders whereby said relays are selectively operated to open the circuit of the feeder at fault.

5. The combination with two parallel feeders, of means responsive to reversals of power on each feeder comprising current elements, and potential elements wound to effectively coöperate with said current elements under conditions of low voltage, and means for rendering said potential elements inactive when the current flow through said feeders is in the same direction and for rendering said potential elements active upon a relative reversal of current flow in said feeders whereby said means operates to selectively open the feeder at fault.

6. The combination with two parallel feeders, relays responsive to the direction of power flow in said feeders comprising current coils, and coöperating potential coils having a relatively large number of turns, a common control device for said relays having a winding responsive to current in each feeder, said windings opposing each other when the current flow in said conductors is in the same direction and assisting each other in response to a relative reversal of current flow in said conductors, a normally open circuit including one of the coils of each relay closed by said control device when said windings assist each other.

7. The combination with two parallel feeders, of relays responsive to the direction of power flow in said feeders comprising current coils, and potential coils wound to effectively coöperate with said current coils under conditions of low voltage, a normally open circuit including one of said coils of each relay, and means for closing said circuit in response to the relative reversal of current flow in said feeders.

8. The combination with two parallel feeders, of relays responsive to the direction of power flow in said feeders comprising current and potential coils, one of said coils of each relay being normally inactive, and means for rendering said coils active upon reversal of the current in one of said feeders whereby said relays are selectively operated to open the circuit of the feeder at fault.

In witness whereof I have hereunto set my hand this 10th day of September, 1917.

DAVID BASCH.